No. 777,856.

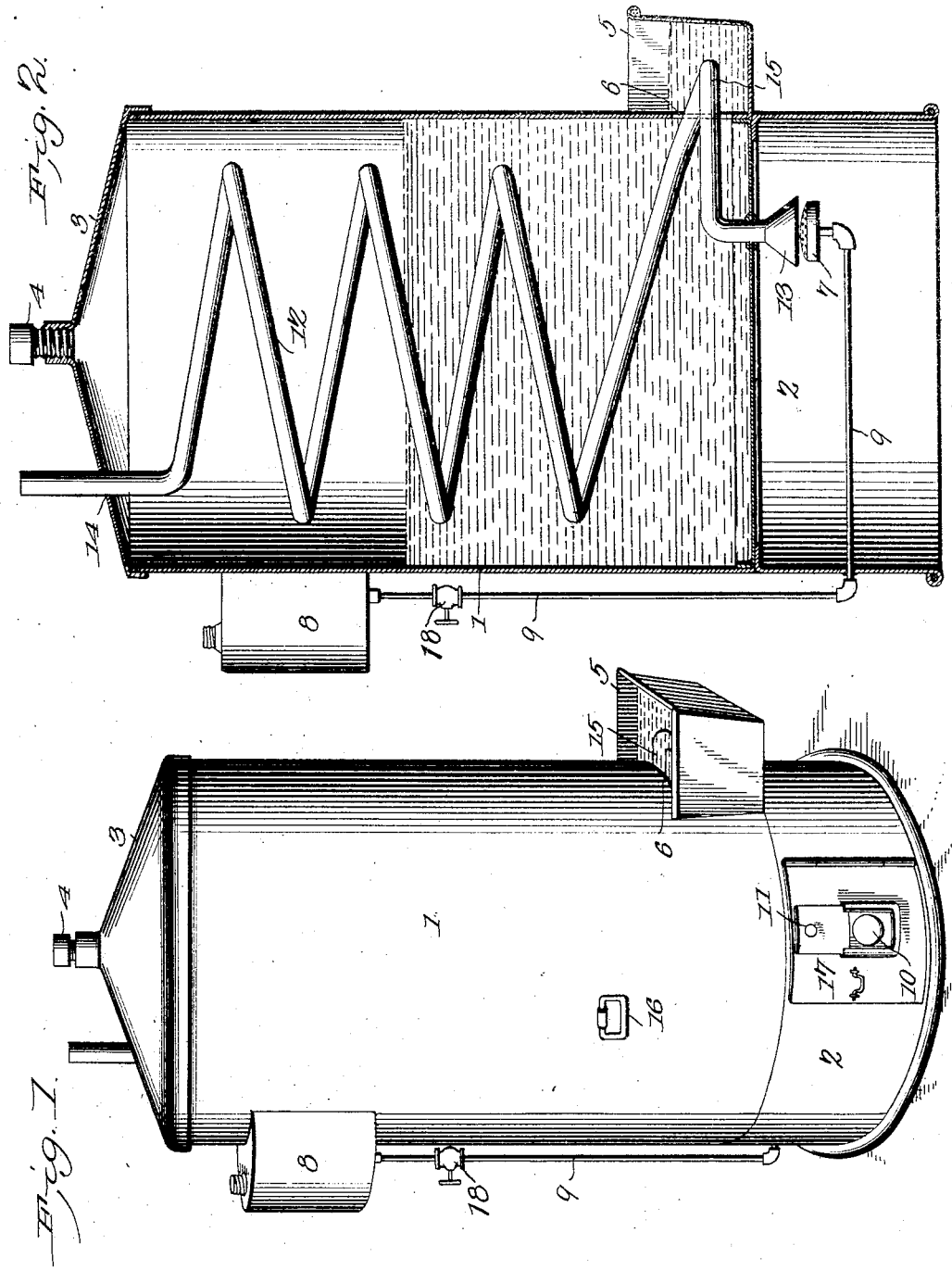

Patented December 20, 1904.

UNITED STATES PATENT OFFICE.

ALPHONSE LA BRECHE, OF JEFFERSON, SOUTH DAKOTA.

STOCK-WATERER.

SPECIFICATION forming part of Letters Patent No. 777,856, dated December 20, 1904.

Application filed April 20, 1904. Serial No. 204,097.

*To all whom it may concern:*

Be it known that I, ALPHONSE LA BRECHE, a citizen of the United States, residing at Jefferson, in the county of Union and State of South Dakota, have invented a new and useful Stock-Waterer, of which the following is a specification.

This invention relates to means for supplying drinking-water to stock and poultry, and has for its object to prevent freezing of the water in the supply-tank and to maintain the same in a drinkable condition.

It is furthermore designed to provide for applying heat directly to the water in the trough, which is exposed to the external air and from which the stock and poultry drink, so as to obviate freezing of the exposed water.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a stock-watering device embodying the features of the present invention. Fig. 2 is a vertical longitudinal sectional view thereof.

Like characters of reference designate corresponding parts in each figure of the drawings.

The present device includes a tank 1, of galvanized iron or any other suitable material, which is supported in an elevated position by means of a foot-flange 2. The top of the tank is closed by a suitable removable cover 3, whereby the tank may be conveniently filled with water and access may also be had to the interior of the tank for cleansing the same. While a flat cover may be employed, it is preferred to provide a conical cover having a screw-cap 4 closing the opening at the upper extremity or apex of the cover. Carried externally of the tank and at the bottom thereof is a trough 5, which is open throughout its top, and the adjacent side of the tank is pierced by an opening 6, so as to establish communication between the tank and the trough.

Beneath the bottom of the tank and within the inclosure formed by the foot-flange 2 is a lamp 7, preferably in the nature of a hydrocarbon-burner, located adjacent the trough and fed from a suitable supply-tank 8, carried externally by the upper portion of the water-tank and communicating with the burner through the medium of a pipe 9, which extends downwardly from the bottom of the fuel-tank and pierces the foot-flange 2. A suitable opening 10 is formed through the flange to supply the necessary air to the burner, and this opening may be wholly or entirely closed by means of a slide 11.

Within the water-tank there is a pipe-coil 12, the lower end of which is enlarged or provided with a funnel 13, constituting a hood to embrace the burner and carry off heated air and products of combustion therefrom, whereby the water within the tank is maintained in a heated condition by the circulation of the heated air and products of combustion through the pipe-coil. The upper end of the pipe-coil pierces the cover of the tank, as at 14, and is open to the external air, so as to admit of the discharge of the heated air, and thereby maintain the desired circulation through the pipe-coil. A portion 15 of the pipe-coil passes through the opening 6 in the side of the tank and into the trough, whereby heat is applied to the water in the trough as well as to that which is in the tank, whereby the water which is exposed to the external air within the trough is prevented from freezing and maintained in a drinkable condition.

For convenience in handling the tank a suitable handle 16 is provided upon one side thereof, and a corresponding handle is provided upon the opposite side of the tank.

A suitable valve 18 is included in the pipe 9, so as to control the supply of fuel to the burner 7.

From the foregoing description it is apparent that all of the parts of the present device are carried by the tank, and therefore the latter may be readily transported without disconnecting any of the parts thereof, whereby the device is always in condition for use. Moreover, it is not necessary to remove the burner and the fuel-tank when they are not required to heat the water, as they do not interfere in any manner whatsoever with free access to the drinking-trough.

In addition to supplying air to the burner the opening 10 in the foot-flange also exposes the burner for convenience in lighting the same. Moreover, it is preferred to have the opening 10 located in the hinged door 17 in the foot-flange 2, so that when the door is open freer access may be had to the burner for cleansing and adjusting the same.

Having thus described the construction and operation of my invention, what I claim as new, and desire to secure by Letters Patent, is—

1. A stock-watering device comprising a water-tank, a drinking-trough carried by and in communication with the tank, a foot-flange for the support of the tank, a hydrocarbon-burner located beneath the bottom of the tank and within the flange, a fuel-tank carried by the water-tank and having a supply-pipe communicating with the burner, the foot-flange having an opening to give access to the burner, a closure for said opening, and a pipe-coil within the water-tank with its upper end in communication with the external air and its lower end in communication with the burner to receive the heated air and products of combustion therefrom, a portion of the pipe-coil being projected through the opening in the side of the water-tank and into the drinking-trough.

2. A stock-watering device comprising a water-tank having a drinking-trough, and means for heating the water within the tank and having a portion introduced into the drinking-trough to prevent freezing of the water therein.

3. A stock-watering device comprising a water-tank having a drinking-trough, and means introduced into the trough to apply heat to the water therein and prevent the same from freezing.

4. A stock-watering device comprising a water-tank having a drinking-trough, and heating means including a pipe-coil having a portion introduced into the drinking-trough.

5. A stock-watering device comprising a water-tank having a drinking-trough, and heating means including a pipe-coil contained within the tank and having a portion introduced into the drinking-trough.

6. A stock-watering device comprising a water-tank having a drinking-trough, a foot-flange for the support of the tank, a heating device within the flange, and a pipe-coil passing through the tank with its lower end in communication with the heating device and its opposite end in communication with the external air, a portion of the pipe-coil being introduced into the drinking-trough.

In testimony that I claim the foregoing as my own I have hereto affixed my signature in the presence of two witnesses.

ALPHONSE LA BRECHE.

Witnesses:
 W. R. MELVIN,
 A. BECHARD.